US012594475B2

(12) United States Patent
Kossowski et al.

(10) Patent No.: US 12,594,475 B2
(45) Date of Patent: Apr. 7, 2026

(54) SKI JUMP AND WINGSUIT FREE FLIGHT SIMULATOR

(71) Applicant: 40MS SPOLKA Z OGRANICZONA ODPOWIEDZIALNOSCIA, Czestochowa (PL)

(72) Inventors: Tomasz Kossowski, Czestochowa (PL); Robert Porada, Czestochowa (PL)

(73) Assignee: 40MS Spolka Akcyjna, Czestochowa (PL)

( * ) Notice: Subject to any disclaimer, the term of this patent is extended or adjusted under 35 U.S.C. 154(b) by 869 days.

(21) Appl. No.: 17/778,682

(22) PCT Filed: Nov. 19, 2020

(86) PCT No.: PCT/PL2020/000085
§ 371 (c)(1),
(2) Date: May 20, 2022

(87) PCT Pub. No.: WO2021/101395
PCT Pub. Date: May 27, 2021

(65) Prior Publication Data
US 2023/0001278 A1     Jan. 5, 2023

(30) Foreign Application Priority Data

Nov. 20, 2019     (PL) ...................................... P.431862

(51) Int. Cl.
*A63B 69/18*          (2006.01)
*A63G 31/00*          (2006.01)
*G09B 19/00*          (2006.01)
(52) U.S. Cl.
CPC .............. *A63B 69/18* (2013.01); *A63G 31/00* (2013.01); *A63B 2069/185* (2013.01); *A63B 2225/09* (2013.01); *A63G 2031/005* (2013.01); *G09B 19/00* (2013.01)

(58) Field of Classification Search
None
See application file for complete search history.

(56) References Cited

U.S. PATENT DOCUMENTS

2017/0234764 A1*   8/2017   Westman ............... A63G 31/00
73/147

FOREIGN PATENT DOCUMENTS

| DE | 42415574 C1 | 3/1994 |
| EP | 1964776 A1 | 9/2008 |
| NZ | 568424 A | 3/2010 |
| WO | 2017142461 A1 | 8/2017 |

OTHER PUBLICATIONS

International Search Report, issued in the corresponding international patent application No. PCT/PL2020/000085, mailed on Mar. 24, 2021.

* cited by examiner

*Primary Examiner* — James B Hull
(74) *Attorney, Agent, or Firm* — Andrzej Malarz, Esq.

(57)          ABSTRACT

A drive unit for air vehicle, which allows building the vertical take-off and landing vehicles, intended for use, for instance, in the production of flying taxis, as well as in the model-making branch and in the toy industry.

Figure 1:
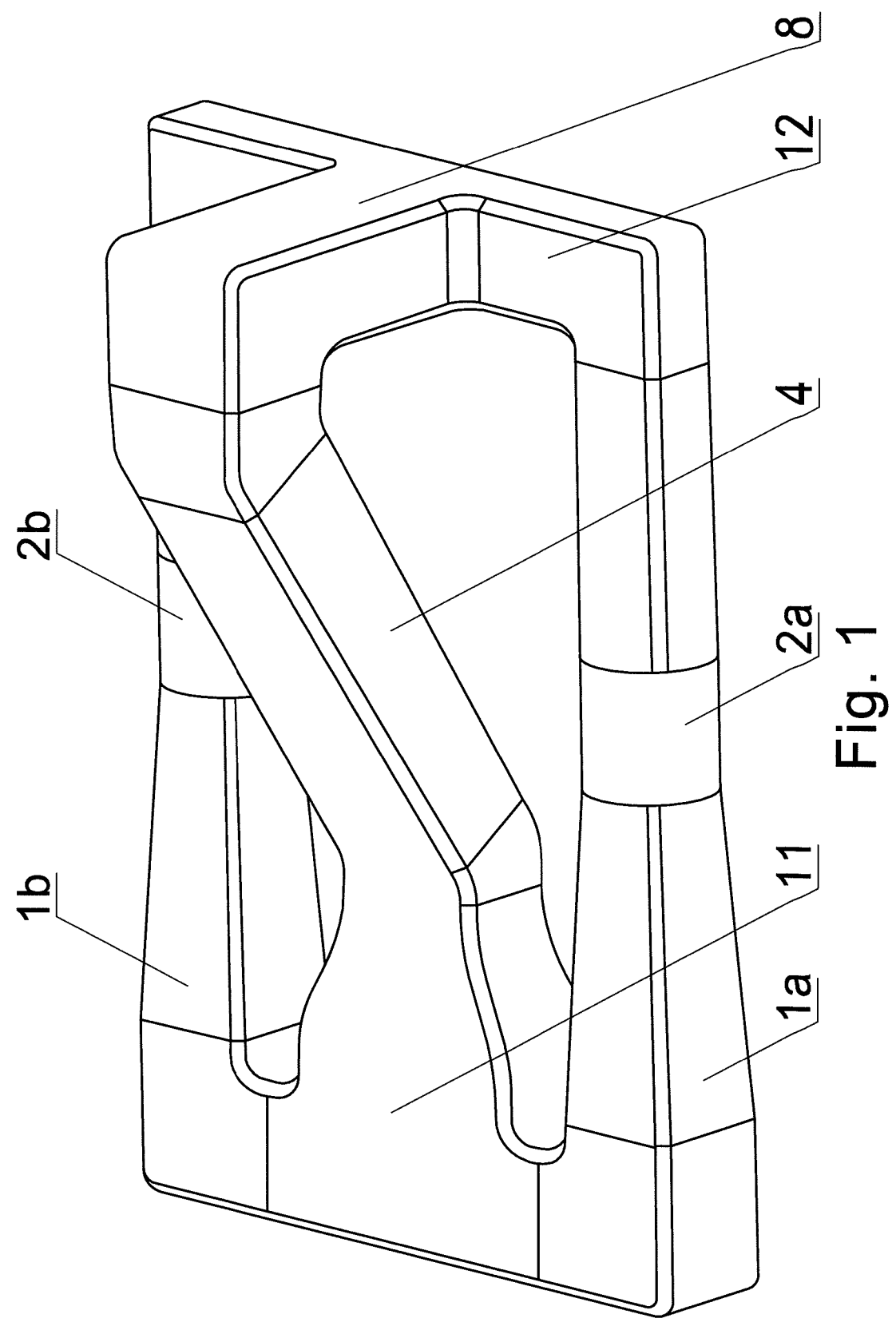

The drive unit is composed of the air channel, in the form of a straight segment of a tube with circular section, which has fans with engines fixed on its both ends. The vertical draft force outlet-inlet nozzle opening is located between fixed fans of the drive unit.

9 Claims, 7 Drawing Sheets

SKI JUMP AND WINGSUIT FREE FLIGHT SIMULATOR

The object of the invention is a ski jump and wingsuit free flight simulator, in which both types of jumps can be simulated. It is designed for recreation purposes and for training in preparation for ski jumps or for wingsuit free jumps.

There are several knows solutions that enable the simulation of ski jumps or wingsuit free flights.

The description of a German invention DE4241574C1 (filed on 10 Dec. 1992) reveals a solution entitled "Flying with closed flying chamber and mesh floor-comprises track with fans under flight path producing air currents upwardly and forwardly inclined through floor and lateral limiting walls". The closed ring-shaped flying track has fans generating upward and forward airflows, enabling controlled flight through the flying chamber in the horizontal direction over the floor of the flying track. The side wall-shaped boundaries include the net tunnel stretched over the floor, grid walls or transparent plastic walls. The grid or tunnel floor being a mesh grid or mesh wall can be made of soft rubber or foam plastic. The device allows for individual, though limited, possibilities of flying for a man. The advantage of this solution is the possibility of universal adjustment for any user.

In turn, the description of a New Zealand invention NZ568424A (filed on 21 May 2008) reveals a solution entitled "Closed circuit wind tunnel with inclined section". The invention disclosed in the application is a closed-circuit wind tunnel, particularly intended for recreation purposes. The tunnel comprises a fan producing a circulating airflow and at least one flight chamber with a take-off area at one end, and landing area at the other. The landing area is lower than the take-off area. The flight chamber has the inclined floor leading from the take-off to the landing site. The roof is inclined parallelly to the floor-hence the air chamber has a constant cross-section throughout the inclination. The tunnel may be used for gliding in the air and may contain equipment for carrying over the glider from the landing area back to the take-off area.

Additionally, the description of a Swedish invention WO2017142461A1 (filed on Feb. 15, 2016) reveals a solution entitled "Wind tunnel for human flight". The invention is an aerodynamic tunnel for a stable, durable flight of man for research or recreation purposes. The tunnel comprising a first part having a first central axis and a second part with a second central axis, the second part being a test section. The first central axis and the second central axis are arranged at a first angle towards each other. There is at least one fan for generating an airflow in the test section, in which the second central axis is arranged at a second angle in relation to the horizontal plane. The angle two ranges from 5° to 85°. The invention relates also to a safety system of the inclined aerodynamic tunnel ensuring a stable and durable flight of the user, including:

- an inclined test section of the aerodynamic section, the latter being arranged at 5°-85° angle in relation to the horizontal plane,
- at least one fan generating the airflow in the test section, the airflow being directed from the upper end towards the low end of the test section,
- a limiting system placed in the test section to prevent the user to leave the test section.

The known solutions provided one-tunnel simulators and therefore only with a single air circulation. The simulators of this type featured a significant height of the construction.

The object of the invention was to create a ski jump and wingsuit free flight simulator, in a close-knit, compact form, making it possible to set it in the ground without deep digging. The height of the simulator will be lower than 8 m over the ground level, meaning the construction fits into the height bracket set for low buildings.

The developed ski jump and wingsuit free flight simulator comprising a flight chamber and fans directing the air stream upwards and enabling universal settlement and adjustment of the device for any user's size is characterized in that it comprises two mutually parallel side tunnels: the first horizontal tunnel with the first power unit and the second horizontal tunnel with the second power unit, forcing two separate airflows, in the first and in the second horizontal tunnel respectively.

The developed simulator also a middle, oblique tunnel situated between the horizontal tunnels. The oblique tunnel comprises a floor, wherein a part of the floor is a movable, tilting platform being the entrance and exit of the simulator.

The platform is affixed in a tilting manner to the lower part of the floor of the oblique tunnel. A pivot axis of the platform is situated transversely in relation to the floor. In the upper part of the movable platform, the simulator comprises a swinging threshold, the position of which is always horizontal regardless of what angle relative to the ground the platform is at the moment.

The simulator further comprises a vertical tunnel connecting to the upper end of the oblique tunnel. The vertical tunnel is set at 90° angle against both first horizontal tunnel and the second horizontal tunnel parallel to the first one. The lower end of the vertical tunnel is inserted into the middle upper part of the longitudinal tunnel going along between the horizontal tunnels.

The above described first and second horizontal tunnels connect to the longitudinal tunnel transverse to them.

In the vertical tunnel, there are obstacles on the way of the airflows causing both airflows to break.

One of the ends of each of the mutually parallel horizontal tunnels as well as one end of the oblique tunnel, are connected to a tunnel transvers to them, which constitutes a confusor.

At the conjunction of the particular tunnels, and in the vicinity of their junction, i.e.:

- the first horizontal tunnel with the confusor,
- the second horizontal tunnel with the confusor,
- the first horizontal tunnel with the longitudinal tunnel,
- the second horizontal tunnel with the longitudinal tunnel,
- the oblique tunnel with the confusor,
- the oblique tunnel with the vertical tunnel, and
- the vertical tunnel with the longitudinal tunnel at least one flow guide is located.

Each flow is controlled by the change of the turning speed of the respective power unit.

Preferably, the confusor, the longitudinal tunnel, and the two external side tunnels—both horizontal tunnels—are located in the ground.

Optimally, in the simulator, an angle α between the parallel axes of the horizontal tunnels and the axis of the oblique tunnel, is the angle of the alteration of the direction of the running flow and ranges from 115° to 175°.

Usually, the floor or a side wall of the oblique tunnel, is a jumbotron or a screen.

More often than not, the side walls of the oblique tunnel are see-through jumbotrons.

Preferably, a ceiling of the oblique tunnel comprises, along its entire length, a rail that enables the sliding of the safety system.

Usually, distances between consecutive flow guides grow, wherein the flow guides close to the external edges of the simulator are at the most distant from each other.

It is possible to introduce a heat transfer medium into at least one flow guide.

Likewise, it is possible to introduce a heat transfer medium into at least one obstacle.

The advantage of the ski jump and wingsuit free flight simulator according to the invention, is its compact size; that could have been achieved by introducing two separate airflow circulations.

Placing the simulator in the ground does not require deep digging. The height of the simulator over the ground level will be lower than 8 meters (usually it is approximately 6 meters over the ground level) meaning it shall fall within the height range set for low buildings.

The developed simulator enables safe performance of ski jumps and free flights in the tunnel. It simulates natural-environment practice even better when, during the jump or flight, a movie is projected showing a ski jumping hill or natural outdoor scenery.

Figure 2:
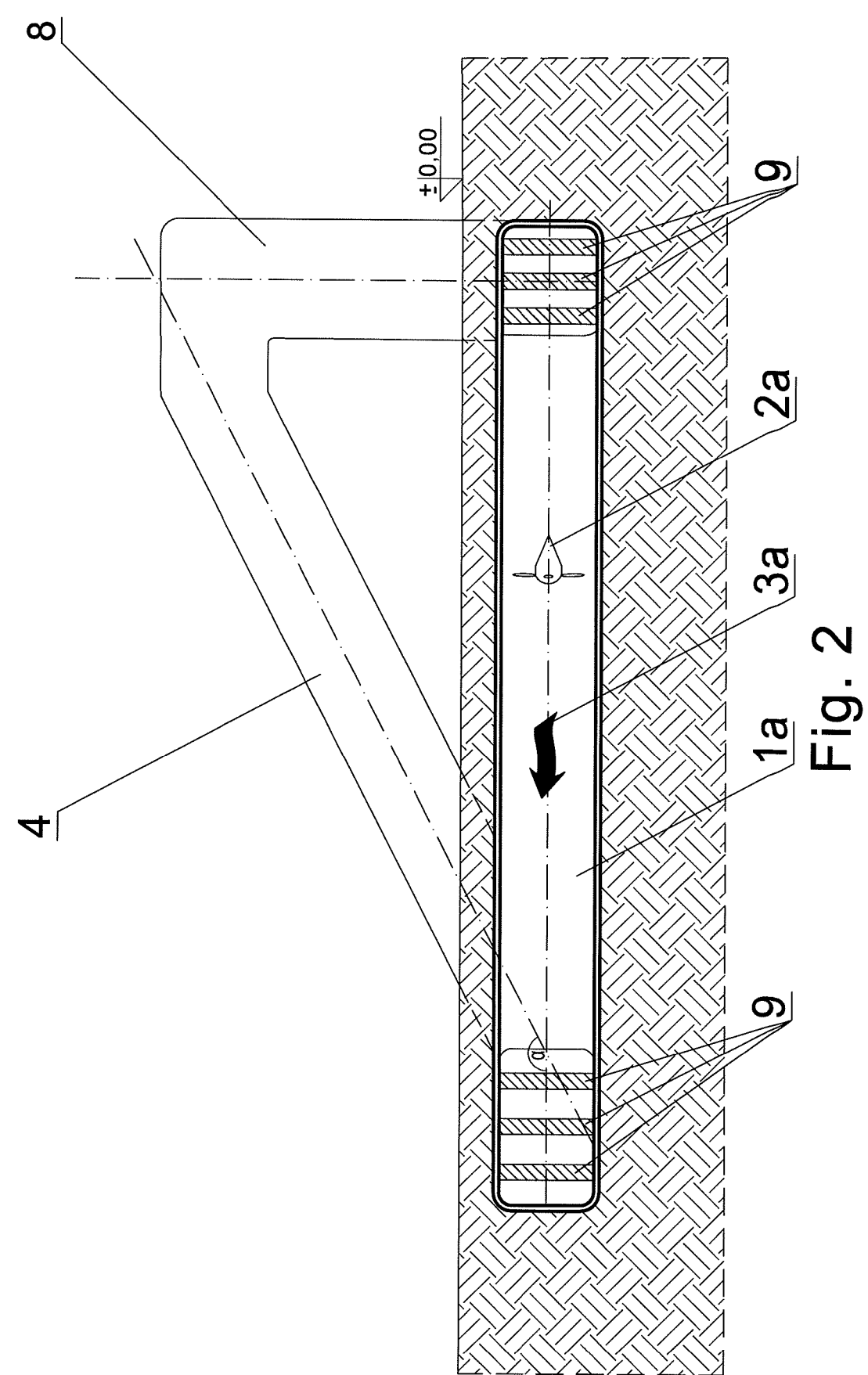
Figure 3:
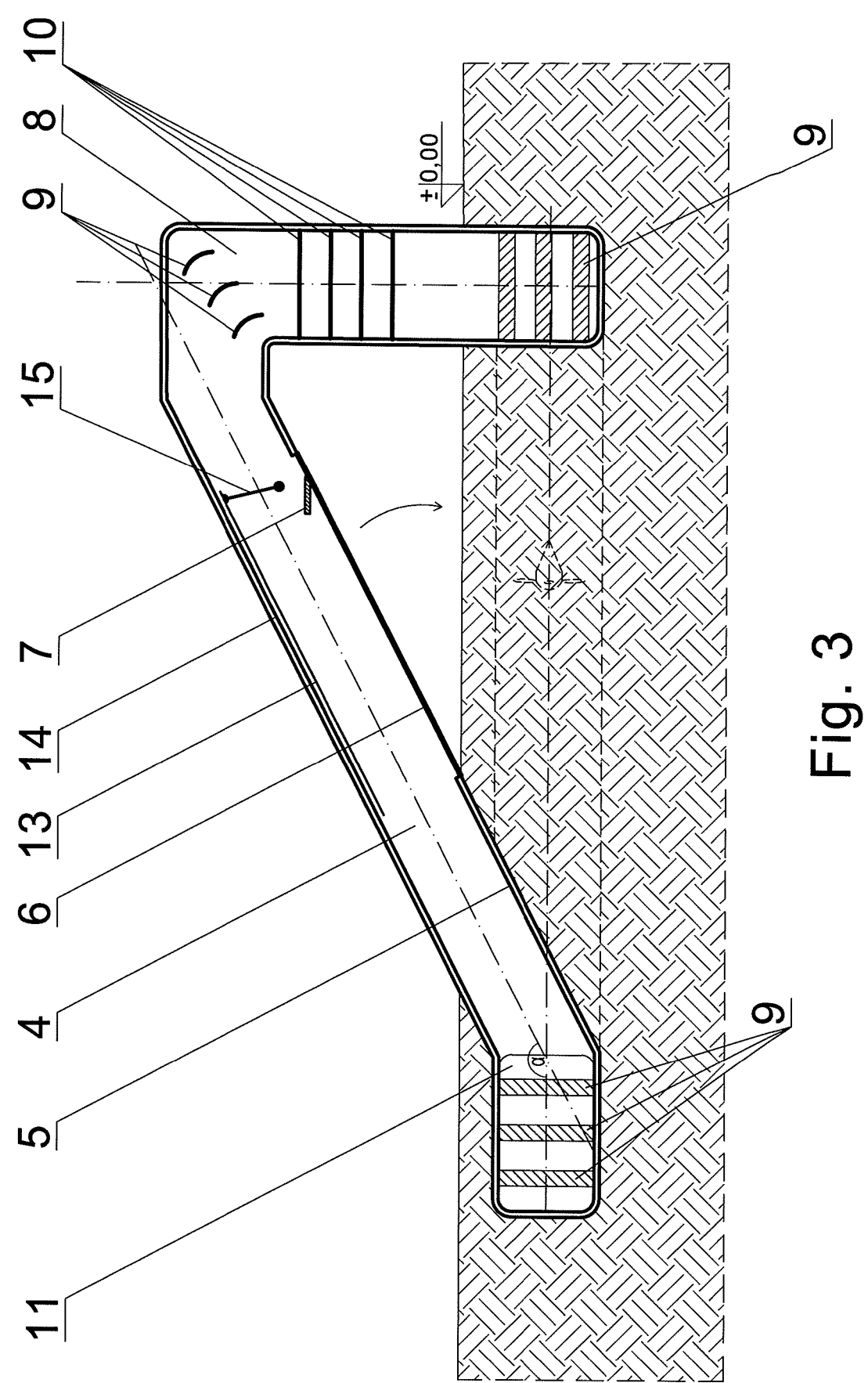
Figure 4:
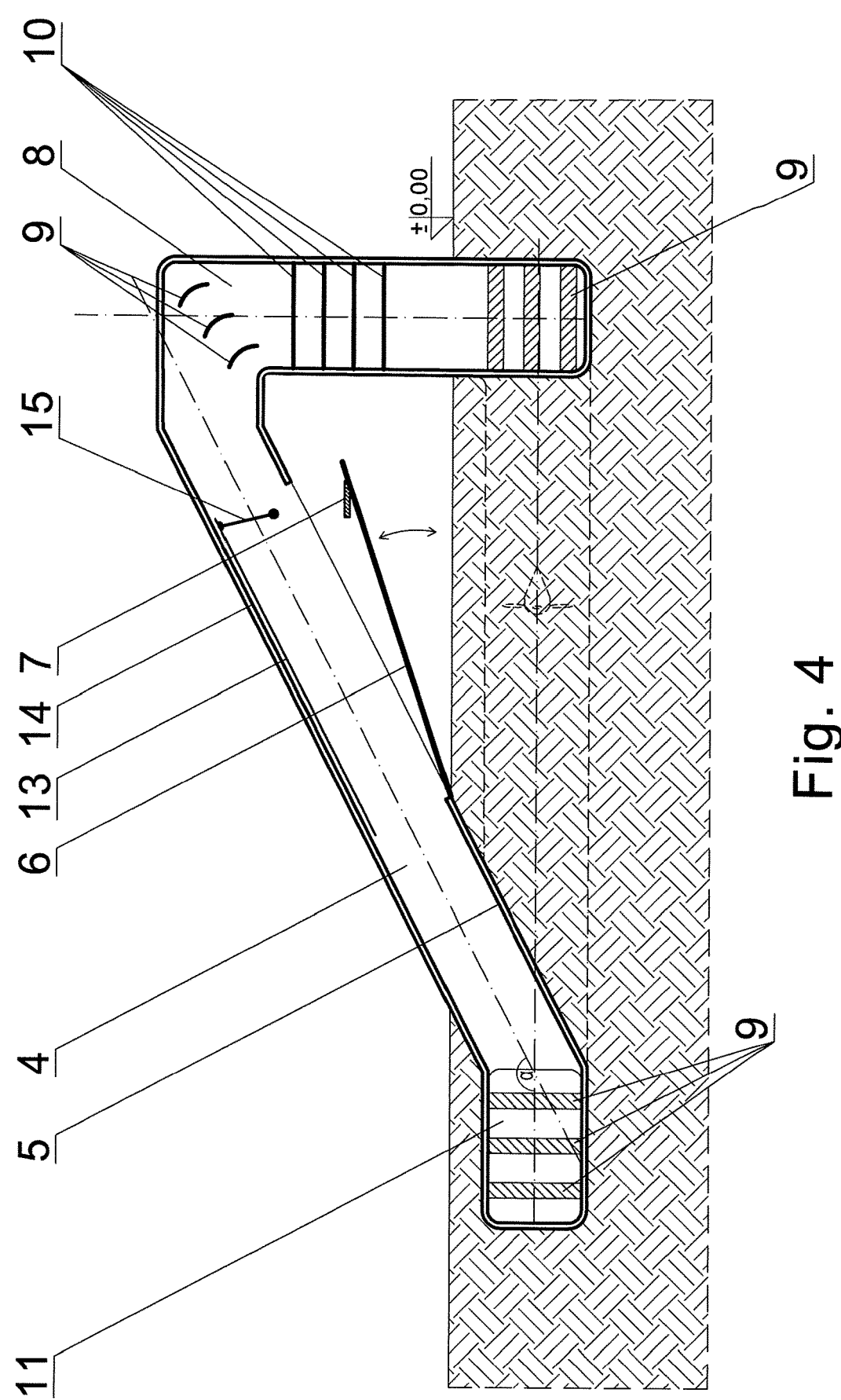
Figure 5:
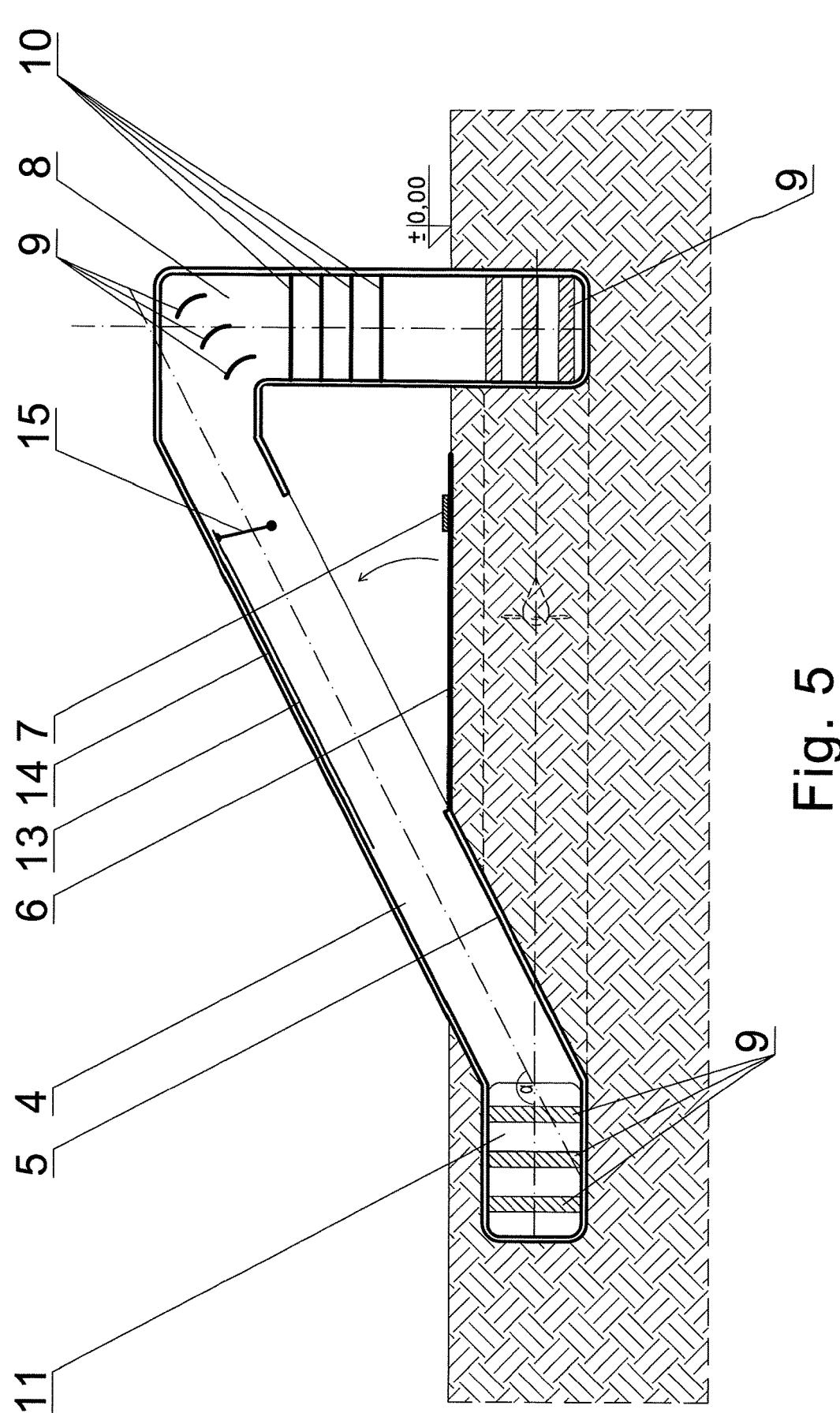
Figure 6:
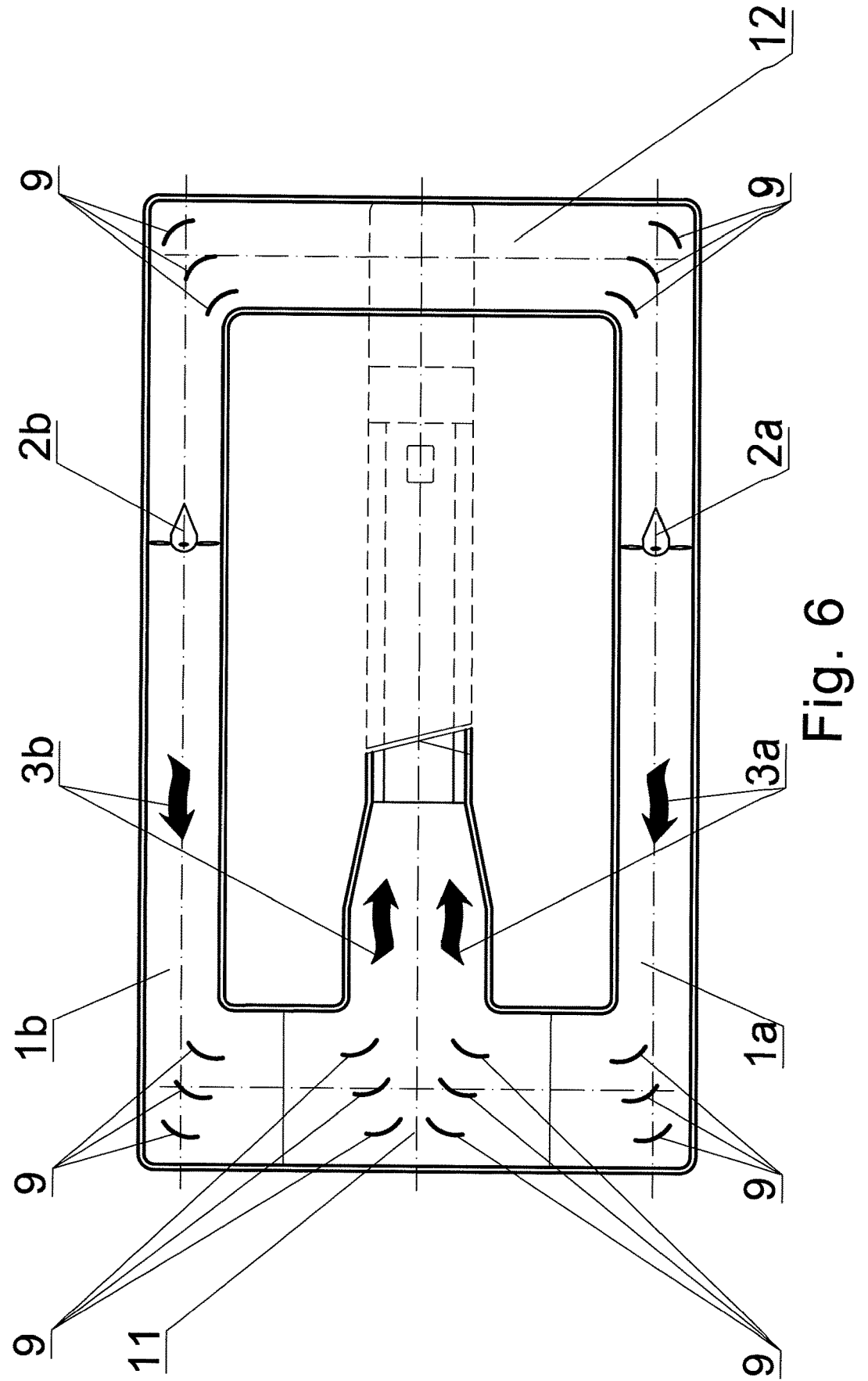
Figure 7:
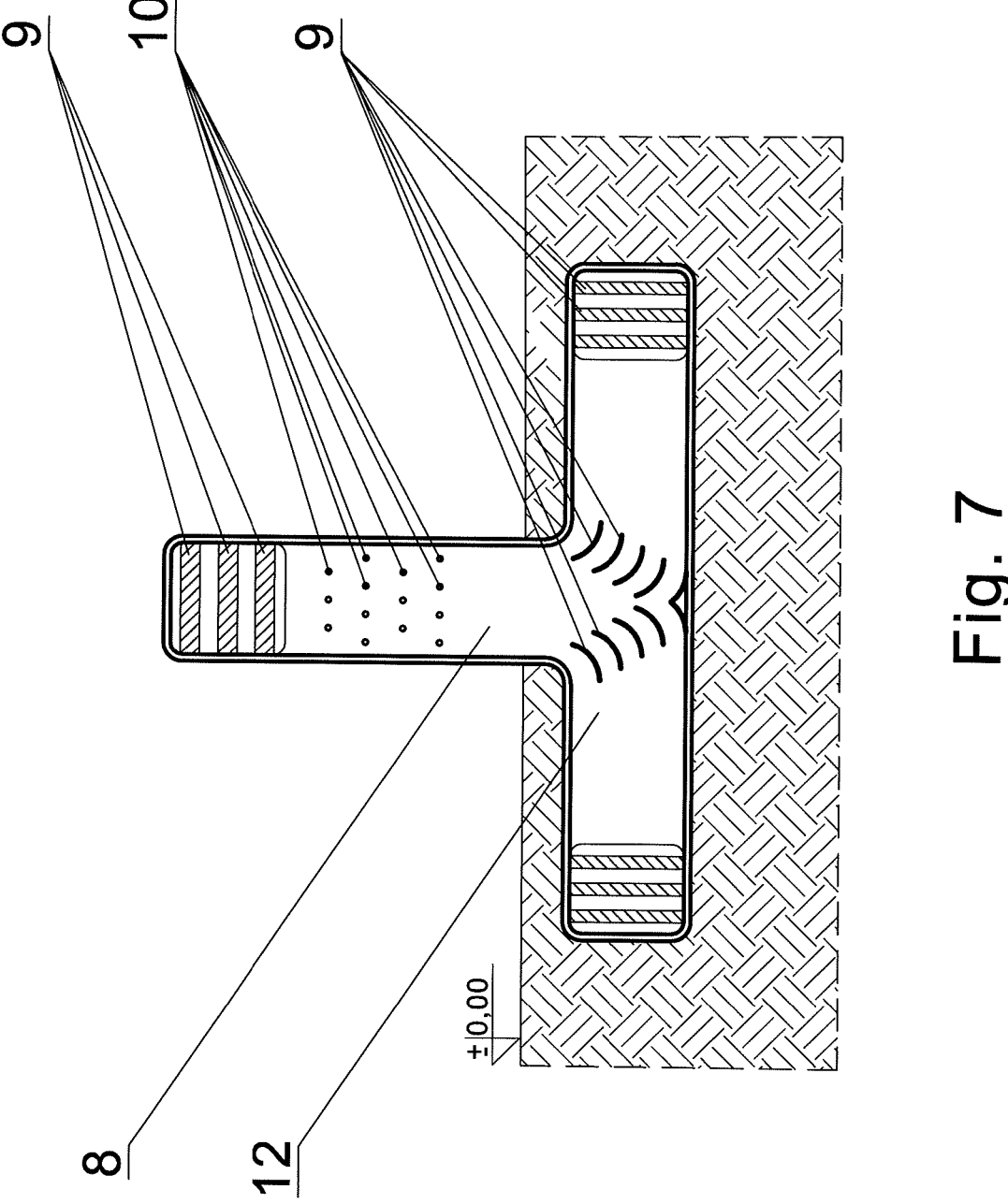

The embodiment of the invention—the ski jump and wingsuit free flight simulator—has been shown in the drawings wherein:

FIG. 1—presents an axonometric view, at an angle from above, of the developed simulator, FIG. 2—presents a longitudinal cross-section of the horizontal tunnel, with the simulator's central part in the background, FIG. 3—presents a longitudinal cross-section of the oblique tunnel with the closed platform and the horizontal tunnel-simulator's side part-in the background, FIG. 4—presents a longitudinal cross-section of the oblique tunnel with the platform shown during the platform's opening or closing, and the horizontal tunnel-simulator's side part-in the background, FIG. 5—presents a longitudinal cross-section of the oblique tunnel with the open platform and the horizontal tunnel-simulator's side part-in the background, FIG. 6—presents a projection of the simulator's lower part, FIG. 7—presents a cross-section of the vertical tunnel, the lower part of which is embedded in the ground and the embankment is even, FIG. 8—presents a cross section of the simulator's vertical tunnel, the lower part of which is embedded in the ground, and the embankment is lower in the simulator's central part.

The invention refers to a simulator of ski jumps performed in a ski jumpsuit, with skis, or to wingsuit free flights.

The developed simulator has two external side tunnels, a horizontal tunnel 1a with a power unit 2a, and a parallel horizontal tunnel 1b with a power unit 2b.

The power unit 2a and the power unit 2b enforce two separate airflows, namely airflow 3a in the horizontal tunnel 1a and airflow 3b in the parallel horizontal tunnel 1b. The airflow 3a and the airflow 3b, which merge with each other in the pre-planned area of the oblique tunnel 4 (described below), induce a lifting force. They therefore constitute an agent enabling wingsuit flights and ski jumps in a suitable suit.

The oblique tunnel 4 comprises a floor 5, part of which is a movable platform 6, being an entry and exit of the simulator.

The platform 6 is affixed in a tilting manner in the lower part of the floor 5 of the oblique tunnel 4, and a pivot axis is situated transversely in relation to the floor 5, being the place of a tilting connection of the floor 5 with the platform 6. When the simulator is open, the platform 6 is dropped and parallel to the ground, "lying" on it.

During the jump simulation the platform 6 is closed and constitutes a lower part of the oblique tunnel 4.

A swinging threshold 7 is affixed to the upper part of the movable platform 6. The threshold 7 position is always horizontal regardless of what the angle relative to the ground the platform 6, being the entry and exit of the simulator, is at the moment.

The threshold 7 is a place where the jumper stands on having entered the open platform 6.

The jumper standing on the threshold 7 moves up together with the platform 6 which is closing in a tilting manner.

When the platform 6 is closed and stowed in thus constituting a uniform lower part of the oblique tunnel 4, the jumper may leap out of the threshold 7 towards the lower part of the oblique tunnel 4.

The airflow 3a and the airflow 3b, which merge and flow in the oblique tunnel 4 from down up, induce a lifting force. The jumper may now perform a jump as long-lasting as he wishes, as the induced lifting force evens up the gravity.

Thus induced combination of forces enables the simulation of the ski jump in a ski suit, or a free flight in a wingsuit.

During the flight the platform 6 starts to open gradually, thus decreasing the airflows—the airflow 3a and the airflow 3b. The opening of the platform 6 forces the jumper to land on the open platform 6. As it is the entry as well as the exit of the simulator, the jumper leaves the simulator in a convenient and easy way.

Other components of the developed design also play important roles for enforcing the proper airflow in the invented ski jump and wingsuit free flights simulator.

First of all, the simulator comprises a vertical tunnel 8 connecting with the upper end of the oblique tunnel 4. The vertical tunnel 8 is arranged at 90° angle against the horizontally situated horizontal tunnel 1a, and horizontal tunnel 1b.

The vertical tunnel 8 has in its upper part at least one flow guide 9, and preferably a set of flow guides 9, as shown on FIG. 3, FIG. 4 and FIG. 5. The flow guides 9 reflect the airflow, i.e. airflow 3a and airflow 3b, directing the airflow in the desired indicated course to the next tunnel—down the vertical tunnel 8.

This is possible, as the set of flow guides 9 is located in the spot where the oblique tunnel 4 connects with the vertical tunnel 8.

In the vertical segment of the vertical tunnel 8 the combined jets of the airflow 3a and the airflow 3b meet the obstacles 10 which break down the jets of the airflow 3a and the airflow 3b. Thanks to these obstacles 10 the airflows are mixed, repeatedly separated and repeatedly merged again.

In this way, the airflow 3a and the airflow 3b, broken by obstacles 10 into smaller airflows, partly merge with each other to form a single airflow.

In the lower part of the vertical tunnel 8, the set of flow guides 9 divides the mixed airflow 3a and airflow 3b again, forming separate airflows 3a and 3b.

The front, low part of the simulator is a tunnel in a shape of a confusor 11.

One of the ends of each mutually parallel tunnels, the horizontal tunnel 1a, the oblique tunnel 4, and the horizontal tunnel 1b is inserted into the tunnel in a shape of the confusor 11. In this way they enter the tunnel in a shape of a confusor 11 which is transversely situated.

In the place where the confusor 11 connects to:

the horizontal tunnel 1*a,*
the oblique tunnel 4, and
the horizontal tunnel 1*b,*
there is at least one flow guide 9 and preferably sets of flow guides 9.

In the confusor 11 the airflow 3*a* and the airflow 3*b* accelerate and meet in the middle part of the confusor 11 and ascend up through the oblique tunnel 4.

The α angle, that is the angle of alteration of the direction of air flowing through, advantageously ranges from 115° to 175° (it is shown on drawings: FIG. 2, FIG. 3, FIG. 4 and FIG. 5). The α angle is set by the angle between the parallel axes of the horizontal tunnels 1*a* and 1*b*, and the axis of the oblique tunnel 4.

Ends opposite to the ends of the horizontal tunnel 1*a* and of the horizontal tunnel 1*b* connecting to the confusor 11 connect to the longitudinal tunnel 12 spreading between them.

The lower end of the vertical tunnel 8 is also connected to the longitudinal tunnel 12, and specifically, it is inserted from above to the middle part of the longitudinal tunnel 12.

The longitudinal tunnel 12 has at least one flow guide 9, and advantageously a set of flow guides 9, in the spot where it connects to the horizontal tunnel 1*a*, and in the spot where it connects to the horizontal tunnel 1*b*.

The confusor 11, the longitudinal tunnel 12 and the two side tunnels, the horizontal tunnel 1*a*, and the horizontal tunnel 1*b*, are located underground and their upper planes usually are totally under the ground level (i.e. under zero-level). Consequently, the simulator stays situated in the ground, advantageously at the depth of approximately 4 meters.

The airflow 3*a* is controlled by the change of the turning speed of the power unit 2*a*, whilst the airflow 3*b* is controlled by the change of the turning speed of the power unit 2*b*. The turning speed is adjusted by at least one frequency transformer.

Summing up, the power unit 2*a* and the power unit 2*b* generate two airflows—the airflow 3*a* and the airflow 3*b*, which having passed the horizontal tunnel 1*a* and the horizontal tunnel 1*b* respectively, and the confusor 11, in which they accelerate, are directed by flow guides 9 towards the oblique tunnel 4.

The airflow 3*a* and the airflow 3*b* are the lifting forces similar to those that lift the jumper during the 'classic' ski jumps performed in natural conditions on the ski jumping hill and similarly imitate the lifting force affecting the jumper during the wingsuit free flight.

The floor 5 and the side walls of the oblique tunnel 4 are preferably jumbotrons or screens, e.g. 4K resolution screens (high resolution standard of digital movies and computer graphics).

The side walls of the oblique tunnel 4 may be the see-through jumbotrons. During the jump or flight, a projection simulating e.g., the ski jumping hill or natural scenery in VR (virtual reality) may be shown on the floor 5 and the on side walls of the oblique tunnel 4.

A ceiling of the oblique tunnel 4 comprises, along its entire length, a rail 14 along which the safety system 15 slides.

The safety system 15, preferably a single-point one, slides along the rail 14 in accordance with the jumper's location. The safety system 15 collaborates with the computer which traces the jumper and projects respective images in classic VR (virtual reality) mode.

The jumper is attached to the safety system 15 by a rope, usually a spring-shaped one.

At the moment when the jump's, or flight's trajectory alters so that the jumper dangerously closes to the side wall, the floor, or the ceiling of the oblique tunnel 4, the safety system 15 activates the lock and prevents jumper's hitting them.

Therefore, the safety system 15 monitors the jumper.

In the set of the flow guides 9, the distances between the consecutive flow guides 9 grow, the largest distance between the two neighboring flow guides 9 is that at the external edges of the simulator.

The sets of the flow guides 9 for each simulator are adjusted, arranged and calibrated before the completion of the simulator, at the stage of appointment of its parameters.

The flow guides 9 are vertical obstacles reflecting the air jets of the airflow 3*a* and the airflow 3*b*.

The flow guides 9 installed in the confusor 11 and in the longitudinal tunnel 12 are elements fixed permanently to the lower and upper walls of the respective tunnel, i.e. of the confusor 11 and the longitudinal tunnel 12.

The flow guides 9 fixed in the vertical tunnel 8 are elements permanently fixed to the side walls of the vertical tunnel 8.

The flow guides 9 are usually hollow, to enable the flow of media cooling the tunnel.

THE LIST OF ELEMENTS

1*a*—horizontal tunnel,
1*b*—horizontal tunnel,
2*a*—power unit,
2*b*—power unit,
3*a*—airflow,
3*b*—airflow,
4—oblique tunnel,
5—floor,
6—platform,
7—threshold,
8—vertical tunnel,
9—flow guide,
10—obstacle,
11—confusor,
12—longitudinal tunnel,
13—ceiling,
14—rail,
15—safety system.

The invention claimed is:

1. A ski jump and wingsuit free flight simulator comprising a flight chamber and fans directing the air jets upwards, providing a possibility to universally control and adjust the simulator to any user's size, characterized in that it has two mutually parallel side tunnels, a horizontal tunnel (1*a*) with a power unit (2*a*) and a horizontal tunnel (1*b*) with a power unit (2*b*) enforcing two separate airflows respectively, an airflow (3*a*) in the horizontal tunnel (1*a*) and an airflow (3*b*) in the horizontal tunnel (1*b*), and the simulator has also, situated between the horizontal tunnels, a middle, oblique tunnel (4) with a floor (5), wherein a part of the floor (5) is a movable tilting platform (6) being an entry and exit of the simulator, affixed in the lower part of the floor (5) of the oblique tunnel (4), a pivot axis of the platform (6) is situated transversely in relation to the floor (5) and in the upper part of the movable platform (6) the simulator is equipped with a swinging threshold (7) always maintaining horizontal position regardless of what the angle relative to the ground the platform (6) is at the moment, the simulator further comprises a vertical tunnel (8) connecting to the upper end of the oblique tunnel (4) and the vertical tunnel (8) placed at 90° angle in relation to the horizontal tunnel (1*a*) and its parallel horizontal tunnel (1*b*) and the lower end of the vertical tunnel (8) is inserted into the medium upper part of a longitudinal tunnel (12) conducted between the horizontal tunnel (1*a*) and the horizontal tunnel (1*b*), the horizontal tunnel (1*a*) and the horizontal tunnel (1*b*) connect to the longitudinal tunnel (12) transverse to them and the vertical tunnel (8) comprises obstacles (10) on the way of the airflow (3*a*) and the airflow (3*b*), breaking the air jets of airflow (3*a*) and airflow (3*b*), wherein one of the ends of each mutually parallel tunnels: the horizontal tunnel (1*a*), oblique tunnel (4) and horizontal tunnel (1*b*) is connected to a tunnel transverse tot hem, which constitutes a confusor (11), wherein in the spot of the conjunction of the individual tunnels, and in the vicinity of their junction:

the horizontal tunnel (1*a*) with the confusor (11), the horizontal tunnel (1*b*) with the confusor (11), the horizontal tunnel (1*a*) with the longitudinal tunnel (12), the horizontal tunnel (1*b*) with the longitudinal tunnel (12), the oblique tunnel (4) with the confusor (11), the oblique tunnel (4) with the vertical tunnel (8), and the vertical tunnel (8) with the longitudinal tunnel (12), at least one flow guide (9) is located and wherein the airflow (3*a*) is controlled by the change of the turning speed of the power unit (2*a*) and the airflow (3*b*) is controlled by the change of the turning speed of the power unit (2*b*).

2. The simulator according to claim 1, characterized in that the confusor (11), the longitudinal tunnel (12), and two external side tunnels, namely the horizontal tunnel (1*a*) and the horizontal tunnel (1*b*), are placed in the ground.

3. The simulator according to claim 1, characterized in that an angle α between the parallel axes of the horizontal tunnel (1*a*) and the horizontal tunnel (1*b*) and the axis of the oblique tunnel (4) is the angle of alteration of the direction of the running flow, and ranges from 115° to 175°.

4. The simulator according to claim 1, characterized in that the floor (5) is a jumbotron or a screen, or the side wall of the oblique tunnel (4) is a jumbotron or a screen.

5. The simulator according to claim 1, characterized in that the side walls of the oblique tunnel (4) are the see-through jumbotrons.

6. The simulator according to claim 1, characterized in that a ceiling of the oblique tunnel (4) comprises along its entire length a rail (14) that enables the sliding of the safety system (15).

7. The simulator according to claim 1, characterized in that distances between consecutive flow guides (9) grow, wherein the flow guides (9) at the outer ends of the simulator being at the most distant from each other.

8. The simulator according to claim 1, characterized in that a heat transfer medium is introduced into at least one of flow guides (9).

9. The simulator according to claim 1, characterized in that a heat transfer medium is introduced into at least one of obstacles (10).

\* \* \* \* \*